United States Patent
Kulicki (10) Patent No.: US 11,325,447 B2
(45) Date of Patent: May 10, 2022

(54) ADJUSTMENT MECHANISM FOR AN AIR VENT

(71) Applicant: Volvo Car Corporation, Gothenburg (SE)

(72) Inventor: Piotr Kulicki, Lindome (SE)

(73) Assignee: Volvo Car Corporation, Gothenburg (SE)

(*) Notice: Subject to any disclaimer, the term of this patent is extended or adjusted under 35 U.S.C. 154(b) by 264 days.

(21) Appl. No.: 16/569,705

(22) Filed: Sep. 13, 2019

(65) Prior Publication Data
US 2020/0130475 A1   Apr. 30, 2020

(30) Foreign Application Priority Data

Oct. 30, 2018 (EP) ..................... 18203414

(51) Int. Cl.
*B60H 1/34* (2006.01)

(52) U.S. Cl.
CPC ... *B60H 1/3421* (2013.01); *B60H 2001/3471* (2013.01)

(58) Field of Classification Search
CPC .......... B60H 1/3421; B60H 2001/3471; B60H 1/3428; F24F 2013/1446
See application file for complete search history.

(56) References Cited

U.S. PATENT DOCUMENTS

| 6,494,780 B1* | 12/2002 | Norbury, Jr. ............ F24F 13/06 454/155 |
| 2007/0111653 A1* | 5/2007 | Endou .................. B60H 1/3421 454/155 |
| 2015/0065031 A1* | 3/2015 | Shibata ................ B60H 1/3421 454/322 |
| 2016/0288624 A1* | 10/2016 | Albin ................... B60H 1/3421 |
| 2018/0170153 A1* | 6/2018 | Lee ...................... B60H 1/3421 |

FOREIGN PATENT DOCUMENTS

| DE | 3719837 C1 | 1/1989 |
| JP | 2016032958 A | 3/2016 |

OTHER PUBLICATIONS

May 28, 2019 European Search Report issue on International Application No. EP18203414.

* cited by examiner

*Primary Examiner* — Steven S Anderson, II
(74) *Attorney, Agent, or Firm* — Clements Bernard Walker; Christopher L. Bernard (57) ABSTRACT

An adjustment mechanism (7) for an air vent (5), which adjustment mechanism is adapted to guide an air stream flowing through the air vent. The adjustment mechanism comprises one or more adjustable first vanes (17) having a main extension in a first direction ($D_1$), one or more adjustable second vanes (19) having a main extension in a second direction ($D_2$) being angled to the first direction, a shaft (23) extending in the first direction and being rotatable around its length axis, a slider (47) being movably attached to the shaft, such that the slider is able to slide along the shaft in the first direction, and a rack (45), extending in parallel to the shaft and a pinion (41), rigidly connected to one of the second vanes and configured to cooperate with the rack.

16 Claims, 6 Drawing Sheets

ADJUSTMENT MECHANISM FOR AN AIR VENT

CROSS-REFERENCE TO RELATED APPLICATION

The present disclosure claims the benefit of priority of co-pending European Patent Application No. 18203414.0, filed on Oct. 30, 2018, and entitled "ADJUSTMENT MECHANISM FOR AN AIR VENT," the contents of which are incorporated in full by reference herein.

TECHNICAL FIELD

The present invention relates to an adjustment mechanism for an air vent adapted to be mounted in a vehicle. The present invention also relates to an air vent comprising such an adjustment mechanism and a vehicle comprising such an air vent.

BACKGROUND

Air vents are utilized in a vehicle in order to provide a passenger compartment and/or a storage compartment with air from outside the vehicle and/or from an HVAC system. Thereby an air stream flows through the air vent and enters the passenger compartment and/or storage compartment. Sometimes it is desirable to be able to adjust the direction of the air stream. This is typically obtained by adjusting the position and/or degree of tilting for one or more vertical vanes and/or horizontal vanes. The vanes are typically adjusted by means of an air adjustment actuator operationally directly or indirectly connected to the vertical vanes and/or horizontal vanes.

The air adjustment actuator may be located at or in the air vent itself, as e.g. is known from patent document US 2013/0165034 A1. However, in that case, the air adjustment actuator may more or less block the air flow from the discharge opening of the air vent.

As an alternative location, the air adjustment actuator may be located in the dashboard besides the discharge opening of the air vent, e.g. as disclosed in patent document US 2006/0172680 A1. However, in such solutions, the air adjustment actuator is connected to the vanes via a rather complicated mechanical linkage system. Further, extra space is needed on the dashboard for the air adjustment actuator.

Document US 20160288624 A1 discloses an air vent disposed between an air circulation device and an interior space. The air vent includes a housing defining a first chamber in fluidic communication with a second chamber, wherein the first chamber includes a fluidic inlet in fluidic communication with the air circulation device and the second chamber includes a fluidic outlet in fluidic communication with the interior space. A first airflow control vane is disposed in the first chamber to direct the airflow from the air circulation device in a first direction. A second airflow control vane is disposed in the second chamber to direct the airflow in a second direction that is orthogonal to the first direction. A single operator-directed device is operatively coupled to the first airflow control vane and the second airflow control vane, and is disposed to independently adjust the positions of the first and second airflow control vanes.

Even though many variants of adjustable air vents are known from prior art, it is nevertheless desirable to provide an improved adjustment mechanism and an improved adjustable air vent, which allow the exiting air stream to be directed vertically as well as horizontally, which avoid complicated mechanical systems between the air adjustment actuator and the vanes, which only minimally block the air flow from the air discharge opening of the air vent, which are space-efficient and/or which are robust and less prone to damage during assembly than prior art solutions.

SUMMARY

The object of the present invention is to overcome or ameliorate at least one of the disadvantages of the prior art, or to provide a useful alternative.

The present invention relates to an adjustment mechanism for an air vent, which adjustment mechanism is adapted to guide an air stream flowing through the air vent. The adjustment mechanism comprises one or more adjustable first vanes having a main extension in a first direction, one or more adjustable second vanes having a main extension in a second direction being angled to the first direction, e.g. being perpendicular to the first direction, a shaft extending in the first direction and being rotatable around its length axis, a slider being movably attached to the shaft, such that the slider is able to slide along the shaft in the first direction, and a rack, extending in parallel to the shaft and a pinion, rigidly connected to one of the second vanes and configured to cooperate with the rack. The shaft is mechanically coupled by at least one first connection to the one or more first vanes, such that a rotation of the shaft is transferred to an adjustment of the one or more first vanes. The slider is adapted to cooperate with the rack, such that a sliding movement of the slider along the shaft displaces the rack, which displacement is transferred to an adjustment of the one or more second vanes by means of the pinion adapted to cooperate with the rack.

The adjustment mechanism is adapted to be comprised in an air vent adapted to be mounted in a vehicle, such as a car. The adjustment mechanism and the air vent may e.g. be located in the dashboard of the vehicle or in a side wall of a vehicle compartment. A housing comprised in the air vent, or one or more portions thereof, may form an integral part of the dashboard or side wall of the vehicle, e.g. being moulded at the same time. As an alternative, the housing may be mounted in an opening or a recess of the dashboard or side wall. Hence, an air discharge opening of the air vent may be positioned flush with a surface of the dashboard or side wall. Further, it would also be possible to utilize the adjustment mechanism and the air vent according to the invention in other vehicles than a car, e.g. a bus, a truck, a lorry, a working machine, an aircraft or a vessel.

Air to be adjusted by the adjustment mechanism according to the invention typically enters the air vent from an HVAC system of the vehicle and/or from ambient air. The air typically exits into a passenger compartment of the vehicle through an air discharge opening. The adjustment mechanism is utilized to adjust the direction of the air stream exiting the air vent. The adjustment of the direction is thereby obtained by adjusting the vanes, e.g. by tilting the vanes. The adjustment mechanism comprises a plurality of adjustable vanes, i.e. at least one adjustable first vane and at least one adjustable second vane. In a neutral position of the adjustment mechanism, the air is typically exiting the air vent in a direction being straight outwards from the air vent, but it is also feasible to select another direction for the neutral position of the adjustment mechanism.

Often the adjustment mechanism is mounted in the air vent of the vehicle in such a way that the first direction coincides with the horizontal direction of the vehicle and the second direction coincides with the vertical direction of the vehicle, assuming the vehicle is standing on flat ground. However, the adjustment mechanism may be mounted in any direction in the vehicle. Further, even if it is preferred that the first direction is perpendicular to the second direction, the first and second directions may instead differ by another angle than 90°, e.g. in the range of from 30° to 90°.

The one or more first vanes has a main extension in the first direction. This means that the first vane has its longest extension in that direction. When the adjustment mechanism is in a neutral position, an extension plane of the first vane, assuming the first vane is substantially flat and otherwise taking the extension plane as a geometrical mean plane, typically extends in the first direction and in a third direction, being perpendicular to the first direction.

For the above-mentioned preferred embodiment, in which the first and second directions are perpendicular to each other, the third direction is perpendicular to both the first and second directions. The extension plane is then in the neutral position perpendicular to the second direction. However, when the first vane is adjusted, the first vane and hence its extension plane is displaced, such that it has a component also in the second direction. This will change the direction of the air stream as seen in the second direction. When the adjustment mechanism is mounted in an air vent in a dashboard of a vehicle, the second direction is typically vertical. Hence, an adjustment of the one or more first vanes directs the air stream upwards or downwards.

Often a single first vane is provided, but it would also be possible to have a plurality of first vanes, e.g. 2, 3, 4 or 5. The first vanes may in that case be located side by side and/or above/below each other, preferably extending parallel to each other. If more than one first vane is provided, they may have the same shape and size.

Often a plurality of second vanes are provided, e.g. a number in the range of from 2 to 20, or from 4 to 10. They may extend parallel to each other, for example equidistantly spaced apart, although it in principle would be enough with a single second vane. If more than one second vane is provided, they may have the same shape and size.

The second vanes have a respective main extension in the second direction. When the adjustment mechanism is in a neutral position, an extension plane of the second vane, assuming the second vane is substantially flat and otherwise taking the extension plane as a geometrical mean plane, extends in the second direction and in the third direction.

For the above-mentioned preferred embodiment, in which the first, second and third directions are perpendicular to each other, the extension plane of the second vane is in the neutral position perpendicular to the first direction, such that the one or more second vanes in the neutral position is/are perpendicular to the first vane/s. However, when the second vanes are adjusted, the second vane and hence its extension plane is displaced, such that it has a component also in the first direction. This will change the direction of the air stream as seen in the first direction. If mounted in a vehicle, the first direction is typically horizontal. Hence, an adjustment of the one or more second vanes would direct the air stream sideways, e.g. to the left or to the right.

The number of first vanes and/or the number of second vanes are preferably adapted to the shape of the housing of the air vent. In a housing having a larger width than height, the number of vertical vanes, typically second vanes, is normally greater than the number of horizontal vanes, typically first vanes.

In a commonly used embodiment, the housing is elongate as seen in its length direction, typically in the transverse direction of the vehicle, and a single first vane, typically being horizontal, and a plurality of second vanes, typically being vertical are provided, with the single first vane being at least partly upstream of the plurality of second vanes.

The one or more first vanes may be located upstream or downstream of the one or more second vanes as seen in a flow direction of the air stream being guided through the air vent. As further described herein, they may also be located in an at least partly overlapping manner.

The shaft extends in the first direction, typically being horizontal when mounted in the vehicle, and is rotatable around its length axis. The shaft is mechanically coupled by at least one first connection to the one or more first vanes, such that a rotation of the shaft around its length axis is transferred to an adjustment, e.g. tilting, of the one or more first vanes. If the shaft is long, it may be beneficial to have more than one first connection, e.g. two, which may be positioned at or adjacent to each end of the shaft.

The slider is movably attached to the shaft, such that the slider is able to slide along the shaft in the first direction, typically horizontally. The slider may e.g. comprise a body at least partly enclosing the shaft. As a complement or an alternative, the slider may be located in a slot of the shaft. The slider may be located such that it in a neutral position of the adjustment mechanism, the slider is located at a centre portion of the shaft as seen along its length direction. The slider may also preferably be connected to the shaft in such a way that a rotation of the slider, e.g. by a user of the adjustment mechanism actuating the slider, is transferred to a rotation of the shaft, which in turn causes an adjustment of the one or more first vanes.

The rack extends in parallel to the shaft but forms a separate body, which is independent of the shaft, i.e. the rack does not move together with the shaft. Accordingly, the above-mentioned rotation of the shaft around its length axis is not transferred to the rack. However, the slider is adapted to cooperate with the rack, such that a sliding movement of the slider along the shaft, i.e. a translational movement, displaces the rack, i.e. preferably in a corresponding translational way. The displacement of the rack is transferred to an adjustment of the one or more second vanes via the one or more pinions cooperating with the rack. The rack may be long enough to be able to cooperate with all of the one or more second vanes.

The pinion is rigidly connected to one of the second vanes, such that a translational displacement of the rack is transferred to a rotation of the pinion and accordingly an adjustment of the one or more second vanes e.g. causing a tilting of the one or more second vanes. The rack may comprise cogs or teeth that are adapted to cooperate with cogs or teeth of the pinion.

If more than one second vane is provided, there may be a pinion rigidly connected to a respective one of the second vanes. As an alternative or a complement, the second vanes may be arranged in one or more groups, such that at least one of the second vanes in the group is provided with a pinion and the other second vanes in the group are coupled to that second vane by means of e.g. a link. In that way, it would be enough that only one of the second vanes in the group is provided with a pinion. It is hence enough if only one of the second vanes of the whole adjustment mechanism is provided with a pinion and the other second vanes are linked to that second vanes, such that the adjustment displacement is transferred to them via the links.

The cogs or teeth of the rack may be divided into groups, wherein each such group is adapted to cooperate with a pinion and the adjacent group is adapted to cooperate with the adjacent pinion, and so on. It would also be feasible that the rack comprises a continuous arrangement of cogs or teeth. It would further also be feasible to have two or more racks, which may be operated in common or separately, e.g. by a respective slider.

The adjustment of the first vane/s and of the adjustment of the second vanes may be performed independently of each other. By freely combining the adjustment of the first vane/s and the adjustment of the second vanes, any desired direction of the exiting air stream may be obtained. As described herein, the same slider may be utilized for both operations.

By utilizing an adjustment mechanism according to the invention, the air stream exiting from the adjustment mechanism, and thus exiting from the air vent e.g. into the passenger compartment of the vehicle, can be directed both as seen in the first direction and as seen in the second direction, typically horizontally as well as vertically. By adjusting in both directions, any desired direction of the exiting air stream may be obtained.

With the adjustment mechanism according to the invention, complicated mechanical systems between the air adjustment actuator and the vanes known from prior art, e.g. comprising a plurality of links, may be avoided. Thereby the adjustment mechanism according to the invention may be made more robust that the ones known from prior art. It may thus be less prone to damage when handled during assembly.

The adjustment mechanism according to the invention may be configured in a space-efficient way making it possible for the air vent to have a compact housing.

Further, the adjustment mechanism according to the invention only minimally blocks the air flow from the air discharge opening of the air vent, which is beneficial in case an a high air flow is wanted.

Preferably, the slider is configured to rotate together with the shaft, the slider thereby being freely rotatable relative to said rack. Accordingly, the slider is configured to be an actuator for the rotation of the shaft, which in turn controls the adjustment of the first vane/s, as explained above. As described above, a sliding movement of the slider along the shaft displaces the rack, which displacement is transferred to an adjustment of the one or more second vanes by means of the pinion adapted to cooperate with the rack Thereby, the slider may be utilized for adjusting both the first vane/s and the second vane/s. Hence, a single actuator, i.e. the slider, is enough to adjust the exiting air stream in any desired direction.

The at least one first connection may comprise and/or be constituted by a geared connection, which comprises one or more teeth or cogs. The teeth or cogs may e.g. form part of a circular circumference. The geared connection is suitable for transferring rotational displacements.

The first connection may be located at or adjacent to an end of the shaft. Thereby the influence on the air flow is minimized and the risk of disturbing the air e.g. by causing turbulence is minimized or preferably avoided. The first connection may e.g. be located outside the housing of the air vent, thus avoiding disturbance of the air flow.

There may be a respective first connection located at or adjacent to each end of said shaft, which is advantageous if the shaft is long, e.g. longer than 15 cm. In that case, both of these may be located outside the housing.

The one or more first vanes may have a respective first rotation axis extending in the first direction, the one or more first vanes being adjustable by being rotatable around the first rotation axis. The first rotation axis is parallel to the main extension of the first vane and is typically located at or adjacent to an edge of the first vane, the edge being closest to the air discharge opening. The first rotation axis may be e.g. located outside a main body portion of the first vane.

For the above-mentioned preferred embodiment, in which the first, second and third directions are perpendicular to each other, the first rotation axis is perpendicular to the second and third directions. When the adjustment mechanism is in a neutral position, the extension plane of the first vane typically extends in the first direction and in the third direction. Hence, the extension plane is perpendicular to the second direction in the neutral position. However, when the first vane is adjusted by being rotated around its rotation axis, the first vane and hence its extension plane is tilted such that it has a component also in the second direction. This will change the direction of the air stream as seen in the second direction. When the adjustment mechanism is mounted in an air vent in a dashboard of a vehicle, the second direction is typically vertical. Hence, an adjustment of the one or more first vanes would direct the air stream upwards or downwards.

The second vanes may have a respective second rotation axis extending in the second direction, the one or more second vanes being adjustable by being rotatable around the second rotation axis. The second rotation axis is parallel to the main extension of the second vane.

For the above-mentioned preferred embodiment, in which the first, second and third directions are perpendicular to each other, the second rotation axis is perpendicular to the first and third directions. When the adjustment mechanism is in a neutral position, the extension plane of the second vane typically extends in the second direction and in the third direction. Hence, the extension plane is in the neutral position perpendicular to the first direction, such that the second vanes in the neutral position is perpendicular to the first vane/s. However, when the second vanes are adjusted by being rotated around their respective second rotation axis, the second vane and hence its extension plane is tilted such that it has a component also in the first direction. This will change the direction of the air stream as seen in the first direction. If mounted in a vehicle, the first direction is typically horizontal. Hence, an adjustment of the one or more second vanes would direct the air stream sideways, e.g. to the left or to the right.

As mentioned above, the sliding movement in the first direction, typically horizontally, of the slider along the shaft is transferable to a displacement of the rack in the first direction. However, in the second direction, typically vertically, the slider may be freely displaceable relative to the rack, e.g. by being rotatable, such that the slider may rotate around the shaft without influencing the rack.

In order to achieve this, the rack may comprise an indentation and the slider may comprise a first protrusion adapted to fit in the indentation, the indentation being open in the second direction, typically vertically, to allow the slider to freely rotate with the shaft without interfering with the rack. The first protrusion faces outwards from the slider in the direction towards the rack. In case the slider comprises a body at least partly enclosing the shaft, as mentioned above and described herein, the first protrusion may form part of that body, e.g. the first protrusion being a ring of that enclosing body. Often two or more such first protrusions are used for better stability of the transfer of movement from the slider to the rack. The number of indentations typically corresponds to the number of first protrusions. There may e.g. be a first protrusion at or adjacent to each end of the slider as seen in the first direction. The indentation of the rack may have a delimitation wall in the first direction, typically horizontally, such that a sliding movement of the slider along the shaft displaces the rack correspondingly by the first protrusion transferring the displacement to the rack via the delimitation wall.

As an alternative, the way of cooperation between the slider and the rack may be inverted, such that the slider may comprise the indentation and the rack may comprise the first protrusion adapted to fit in the indentation.

The slider may comprise a second protrusion and the shaft may comprise a groove extending the first direction, the second protrusion being located at least partly in the groove. The second protrusion thus faces the shaft. In case the slider comprises a body at least partly enclosing the shaft, as mentioned above and described herein, the second protrusion may form part of that body, e.g. being located at an internal wall of that body. The second protrusion is free to translationally slide in the groove in the first direction, but a rotation of the slider causes the shaft to rotate by the second protrusion cooperating with the groove. The groove thus allows a sliding movement along the shaft, but is able to transfer a rotational movement. The second protrusion may be extended in the first direction, e.g. comprising or being constituted by a rib on the internal wall of the body. It would also be possible to instead have two, three or more small second protrusions all fitting in the groove of the shaft.

As an alternative, the way of cooperation between the slider and the shaft may be inverted, such that the shaft comprises the second protrusion and the slider comprises the groove.

As yet an alternative for the interface between the shaft and the slider is that the shaft has a polygonal cross-section, e.g. square or rectangular, with flat sides and the slider comprises corresponding flat surfaces in the slot or throughgoing opening, in which the shaft goes through the slider.

The adjustment mechanism may further comprises an air adjustment actuator connected to or integrated with the slider. The air adjustment actuator may be in the form of a tab protruding from the slider towards the user. The air adjustment actuator makes it easy for the user to actuate the adjustment mechanism, since the air adjustment actuator is easy to operate and may also be actuated with a single finger. Moreover, the position and/or direction of the air adjustment actuator indicates the direction of the discharged air stream. Preferably, the air adjustment actuator protrudes from the housing of the air vent making it easy for the user to operate the adjustment mechanism, while the rest of the adjustment mechanism may be located within the housing, protected by the housing and hidden from view.

The one or more second vanes may comprises a first vane portion at least partly located at a first side, e.g. above, of the one or more first vanes and a second vane portion located at a second opposite side, e.g. below of the one or more first vanes. Hence, a part of the first vane portion may be located straight above the first vane and a part of the second vane portion may be located straight below the first vane. This allows the adjustment mechanism to be space-efficient and the air vent to have a compact housing. Purely as an example, the one or more first vanes and the one or more second vanes may be comprised in a common chamber of the air vent.

The present invention also relates to an air vent comprising an adjustment mechanism as described herein and an elongate housing having a length in the first direction of the adjustment mechanism, wherein the housing encloses the one or more first vanes and the one or more second vanes, the slider being directly or indirectly accessible from an outside of the housing, e.g. by means of the air adjustment actuator described herein.

The advantages described above for the adjustment mechanism as described herein are valid for the air vent as well. The air vent according to the invention may be configured in a space-efficient way having a compact housing. It is easy to mount in a dashboard or a side wall of the vehicle. It may be mounted in such a way that the air discharge opening is flush with a surface of the dashboard or side wall.

The air vent may comprise a number of subgroups of vanes, which may be controlled by separate adjustment mechanisms as described herein.

The air vent may comprise an air guide, also called a bevel, at least partly located within the housing, fixedly positioned in relation to the housing and extending in the first direction. Preferably, the air guide is located downstream of the one or more first vanes and the one or more second vanes as seen in a flow direction of the air stream being guided through the air vent.

The air guide is fixedly positioned in relation to the housing and is at least partly located inside the housing, optionally completely inside the housing, and extends in the length direction of the housing. The air guide is utilized to divide the air stream into a first air flow at one side of the air guide, e.g. above, and a second air flow at the other side of the air guide, e.g. below. The air guide is preferably located at or adjacent to a longitudinal centre line of the housing. This location of the air guide is suitable for air vents, in which it is desirable to be able to guide an equal amount of air at either side of the air guide.

Further, the air vent according to the invention makes it possible to use a continuous air guide and, yet, avoid complicated linkage systems in the adjustment mechanism, e.g. between the air adjustment actuator and the vanes.

The air guide may extend continuously in the length direction at least partly inside the housing. Preferably, the air guide may extend along the whole length or substantially the whole length of the housing. By utilizing the air vent according to the invention, it is possible to use a continuous air guide even if it extends along a full length of the housing. In that case, the air guide forms an unbroken line, which may be visible from the outside of the air vent. The slider is displaceable in relation to the air guide in order to operate the adjustment mechanism.

The shaft and/or rack of the adjustment mechanism may be located within the air guide. Thereby they are protected from the outside. Further, they are hidden from external view.

When the adjustment mechanism of the air vent comprises the air adjustment actuator connected to or integrated with the slider described herein, the air adjustment actuator is displaceable in relation to the air guide in order to operate the adjustment mechanism. Preferably the air adjustment actuator protrudes above or below the air guide, making it easy to operate by the user.

The one or more first vanes and one or more second vanes may located in a common chamber within the housing. This allows for a compact and space-efficient air vent. Preferably a first vane portion of one or more second vanes is at least partly located at a first side of the one or more first vanes and a second vane portion of the one or more second vanes is located at a second opposite side of the one or more first vanes. This contributes to making the air vent compact and space-efficient.

The present invention further relates to a vehicle comprising the air vent as described herein, preferably located in a dashboard of the vehicle, such that the first direction form a horizontal direction of the vehicle and the second direction forms a vertical direction of the vehicle.

BRIEF DESCRIPTION OF THE DRAWINGS

The present invention will hereinafter be further explained by means of non-limiting examples with reference to the appended drawings wherein.

It should be noted that the appended drawings are schematic and that individual components are not necessarily drawn to scale and that the dimensions of some features of the present invention may have been exaggerated for the sake of clarity.

DETAILED DESCRIPTION

The invention will, in the following, be exemplified by embodiments. It should however be realized that the embodiments are included in order to explain principles of the invention and not to limit the scope of the invention, as defined by the appended claims. A feature from one embodiment may be combined with one or more features of any other embodiment.

Figure 1:
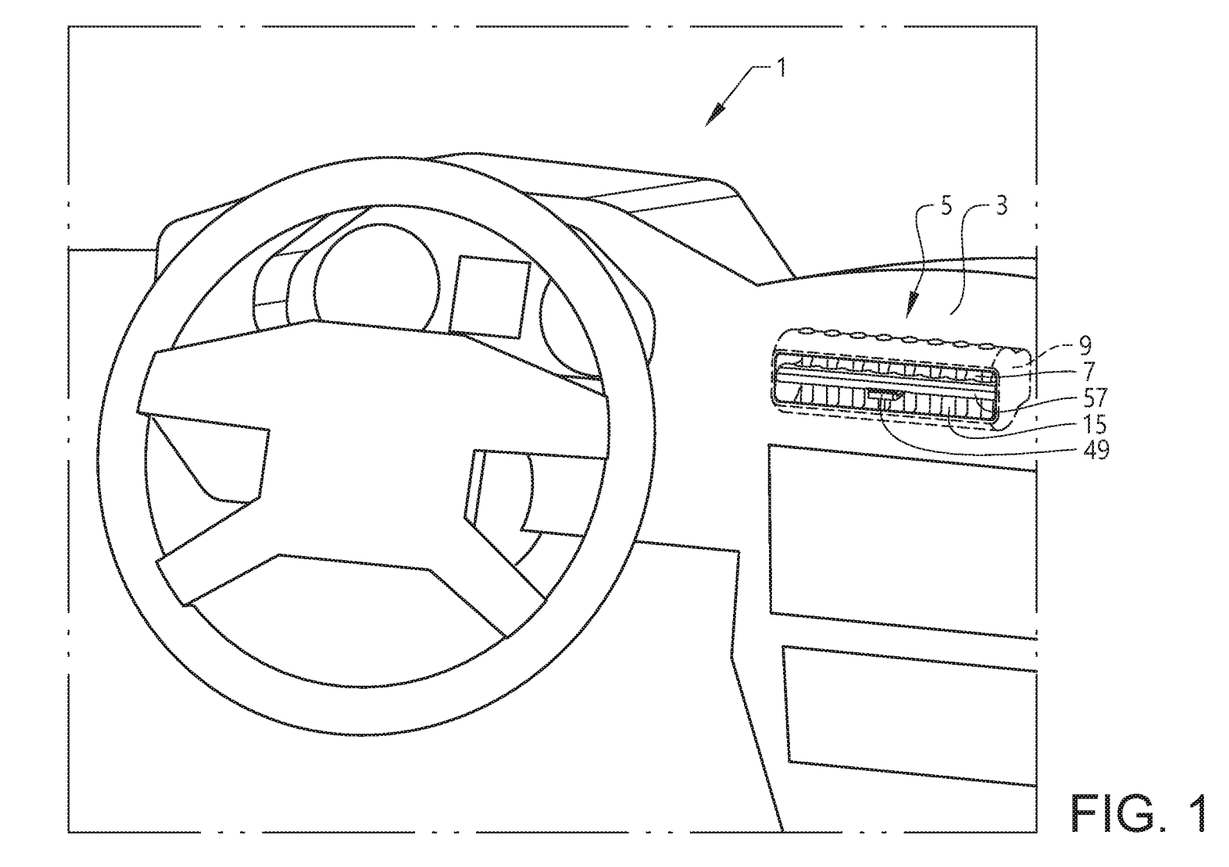
FIG. 1 is a schematic view of an adjustable air vent with an adjustment mechanism according to the invention mounted in a dashboard of a vehicle.

FIG. 1 illustrates a portion of vehicle 1, here exemplified as located in a car, which comprises a dashboard 3. An adjustable air vent 5 according to the invention is located in the dashboard 3. An air stream exiting the air vent 5 may be adjusted by means of an adjustment mechanism 7 comprised in the air vent 5, such that an occupant of the vehicle can direct the discharged air stream in a desirable direction.

The air vent 5 comprises an elongate housing 9 having a length in a first direction $D_1$, in the illustrated embodiment coinciding with the transverse direction of the vehicle 1. See FIG. 2. The housing 9 has a height in a second direction $D_2$, in the illustrated embodiment coinciding with the vertical direction of the vehicle 1. The housing 9 also extends in a third direction $D_3$, in the illustrated embodiment coinciding with a longitudinal direction of the vehicle 1. Hence, in the illustrated embodiment, the first direction $D_1$, the second direction $D_2$ and the third direction $D_3$ are perpendicular to each other. The housing 9 encloses a main portion of the adjustment mechanism 7, which however is adjustable from the outside of the housing 9 as is further described below. The housing 9 comprises an air inlet 11, a chamber 13 and an air discharge opening 15.

Figure 2:
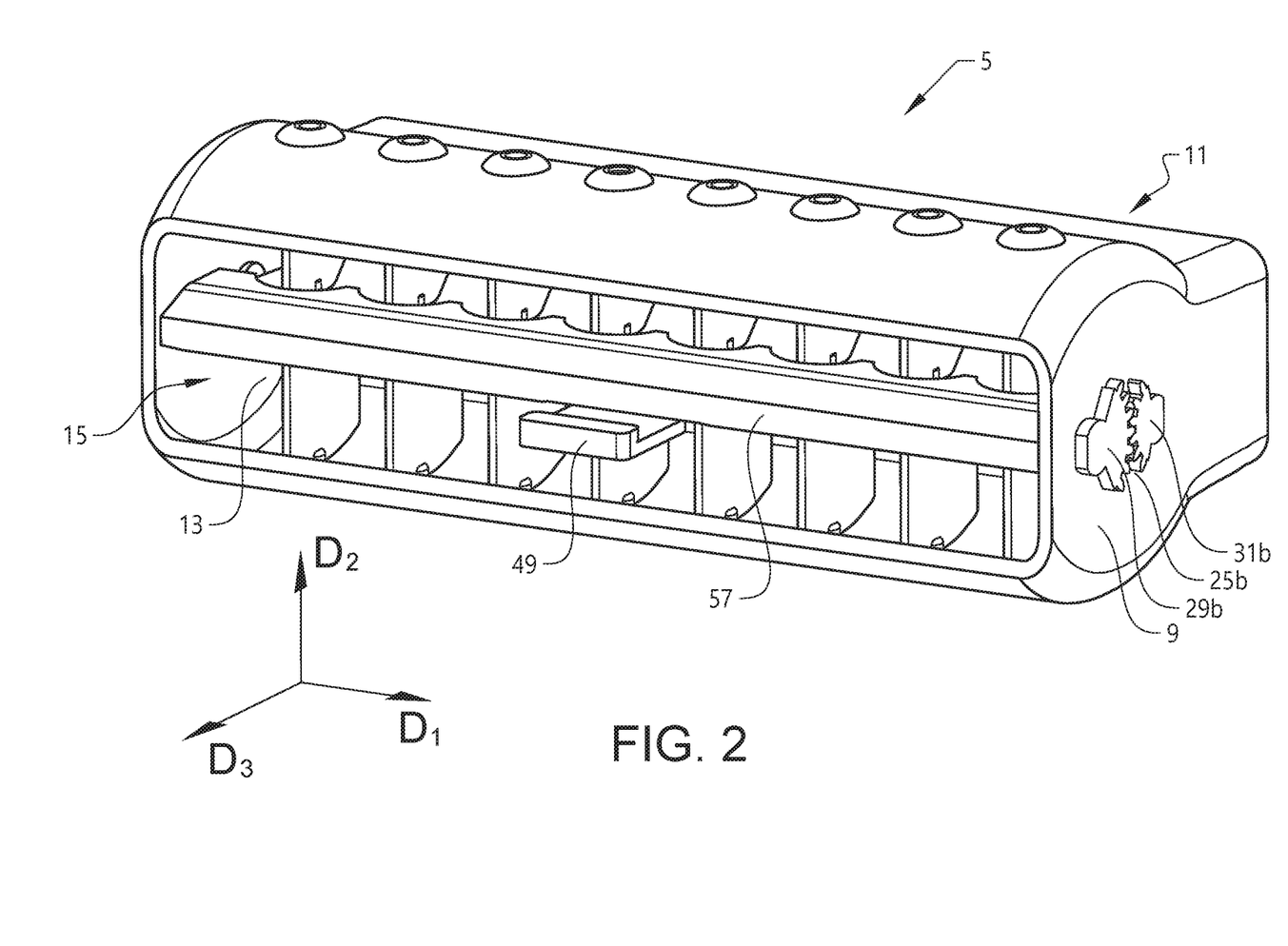
FIG. 2 is a perspective view of the air vent with the adjustment mechanism in a neutral position.
Figure 3:
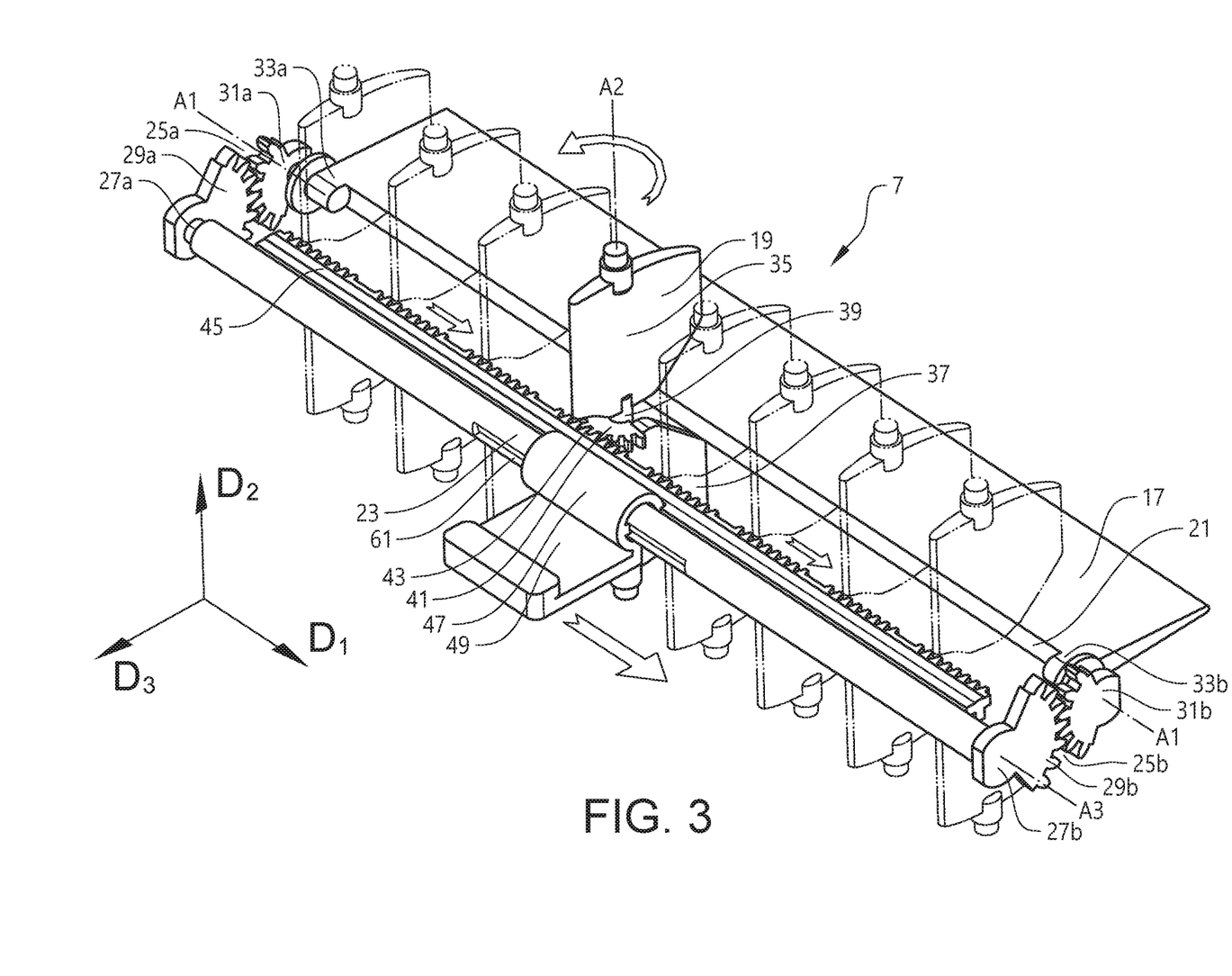
FIG. 3 is a perspective view of the adjustment mechanism in a neutral position.

FIG. 3 illustrates the adjustment mechanism 7 according to the invention. The housing 9 of the air vent 5 has been removed from the figure for better visibility. In the illustrated embodiment, the adjustment mechanism 7 comprises an adjustable first vane 17 having a first rotation axis $A_1$ extending in the first direction $D_1$. The adjustment mechanism 7 further comprises a plurality of adjustable second vanes 19 having a respective second rotation axis $A_2$ extending in the second direction $D_2$. As can be seen in FIGS. 2 and 3, the air vent 5 of the illustrated embodiment is intended to have eight second vanes 19, although only one of them is fully depicted and the others just indicated. Both the first vane 17 and the second vanes 19 are located in the chamber 13 of the housing 9, cf. FIG. 2, with the first vane 17 located at least partly upstream of the second vanes 19 as seen in a flow direction of the air passing the air vent 5, i.e. the first vane 17 is located closest to the air inlet 11.

The first rotation axis $A_1$ of the first vane 17 is parallel to a main extension of the first vane 17 and is typically located at or adjacent to a front edge 21 of the first vane 17, i.e. at the side being closest to the air discharge opening 15. In the illustrated embodiment, the first rotation axis $A_1$ is located outside of the main body portion of the first vane 17.

The adjustment mechanism 7 further comprises a shaft 23 extending in the first direction $D_1$ and being rotatable around it length axis $A_3$. The shaft 23 is mechanically coupled by at least one first connection 25a, 25b to the first vane 17, such that a rotation of the shaft 23 is transferred to a tilting adjustment of the first vane 17 through rotation around the first rotation axis $A_1$. In the illustrated embodiment, there is a first connection 25a, 25b at each end 27a, 27b of the shaft 23. In principle, a single first connection 25a, 25b would be enough, but especially of the shaft 23 is long, it may be preferably to have two first connections 25a, 25b as in the illustrated embodiment.

The first connection 25a, 25b comprises a geared connection comprising a plurality of cogs. The cogs may form part of a circular circumference, as is illustrated. A first portion 29a, 29b of the first connection 25a, 25b is fixedly attached to the ends 27a, 27b of the shaft 23. A second portion 31a, 31b of the first connection 25a, 25b is fixedly attached at corner portions 33a, 33b of the first vane 17, such that the first rotation axis $A_1$ forms a centre of the circularly arranged cogs of the second portion 31a, 31b of the first connection 25a, 25b.

In the illustrated embodiment, the first connections 25a, 25b are as an option located outside the housing 9, which is best seen in FIG. 2. Thereby the influence on the air flow is minimized and the risk of disturbing the air e.g. by causing turbulence is minimized or preferably avoided.

When the adjustment mechanism 7 is in a neutral position, as depicted in FIG. 3, an extension plane of the first vane 17 extends in the first direction $D_1$ and in the third direction $D_3$. Hence, the extension plane is perpendicular to the second direction $D_2$ when in the neutral position. However, when the first vane 17 is rotated around its rotation axis $A_1$, the first vane 17 and hence its extension plane is tilted such that it has a component also in the second direction $D_2$. This will change the direction of the air stream as seen in the second direction $D_2$. In the illustrated embodiment, an adjustment of the first vane 17 would direct the air stream upwards or downwards. This is further described below in conjunction with FIG. 6.

As an option, shown in the illustrated embodiment, the second vane 19 comprises a first vane portion 35 and a second vane portion 37. The first vane portion 35 is located at a position above the first vane 17 as seen in the second direction $D_2$. Thereby, a part of the first vane portion 35 is located straight above the first vane 17. The second vane portion 37 is located at a position below the first vane 17 as seen in the second direction $D_2$. Thereby, a part of the second vane portion 37 is located straight below the first vane 17. Hence the first way 17 is located party upstream of the second vanes 19 in a partly overlapping manner.

The first vane portion 35 and the second vane portion 37 are connected by a spindle 39 forming the second rotation axis $A_2$. Located between the two vane portions 35, 37, a pinion 41 is fixedly connected to the spindle 39. The pinion 41 comprises a plurality of cogs adapted to cooperate with corresponding cogs forming a group of cogs 43 on a rack 45. The rack 45 extends in parallel to the shaft 23 but forms a separate body, which is independent of the shaft 23, i.e. the rack 45 does not move together with the shaft 23. In the illustrated embodiment, the rack 45 comprises a group of cogs 43 for the pinion 41 of each second vane 19 with interspaces between the groups. However, it would also be feasible that the rack 45 comprises a continuous arrangement of cogs or teeth.

The adjustment mechanism 7 further comprises a slider 47, which is movably attached to the shaft 23, such that the slider 47 is able to slide along the shaft 23 in the first direction $D_1$, illustrated as horizontally. The slider 47 comprises a body enclosing the shaft 23. In the illustrated embodiment, the slider 47 is located such that it in the neutral position of the adjustment mechanism 7, as in FIG. 3, the slider 47 is located at a centre portion of the shaft 23 as seen along its length direction. The slider 47 is adapted to cooperate with the rack 45, such that a sliding movement of the slider 47 along the shaft 23 displaces the rack 45, which displacement is transferred to an adjustment of the second vanes 19 through rotation around the respective second rotation axis $A_2$ by means of the one or more pinions 41 cooperating with the rack 45, as is further described below in conjunction with FIG. 7.

As an option, an air adjustment actuator in the form of a tab 49 is connected to or integrated with the slider 47. The tab 49 makes it easy for a user to actuate the adjustment mechanism 7, since the tab 49 is easy to operate and may also be actuated with a single finger. Moreover, the position of the tab 49 indicates the direction of the discharged air stream. As can be seen in FIGS. 1 and 2, the tab 49 protrudes from the housing 9 of the air vent 5, making it easy for the user to operate the adjustment mechanism 7, while the rest of the adjustment mechanism 7 is located within the housing 9, protected by the housing 9 and hidden from view.

Figure 4:
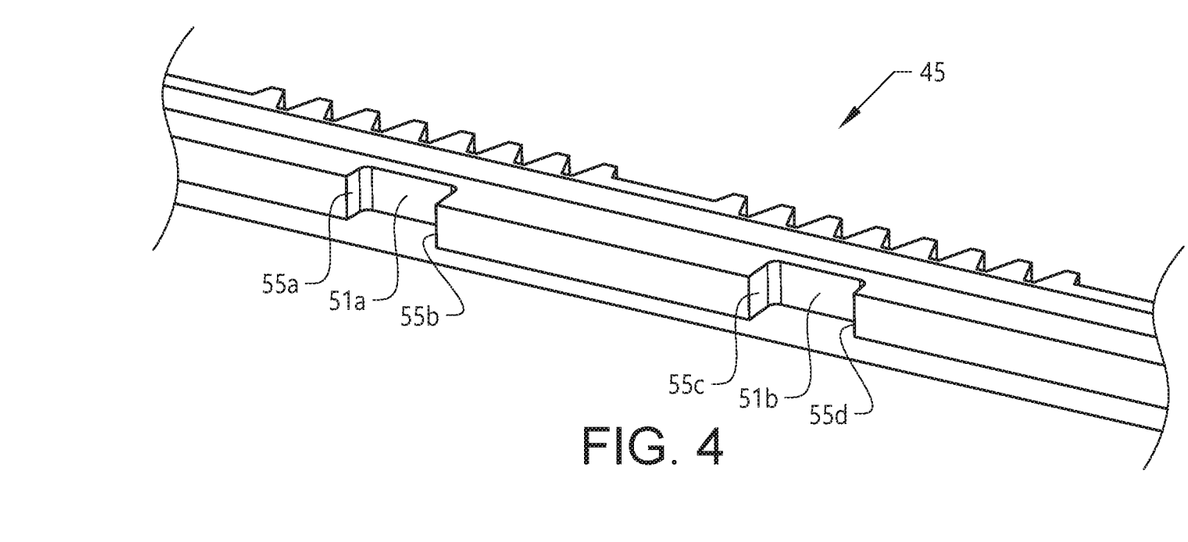
FIG. 4 is a detailed view of a portion of a rack of the adjustment mechanism.
Figure 5:
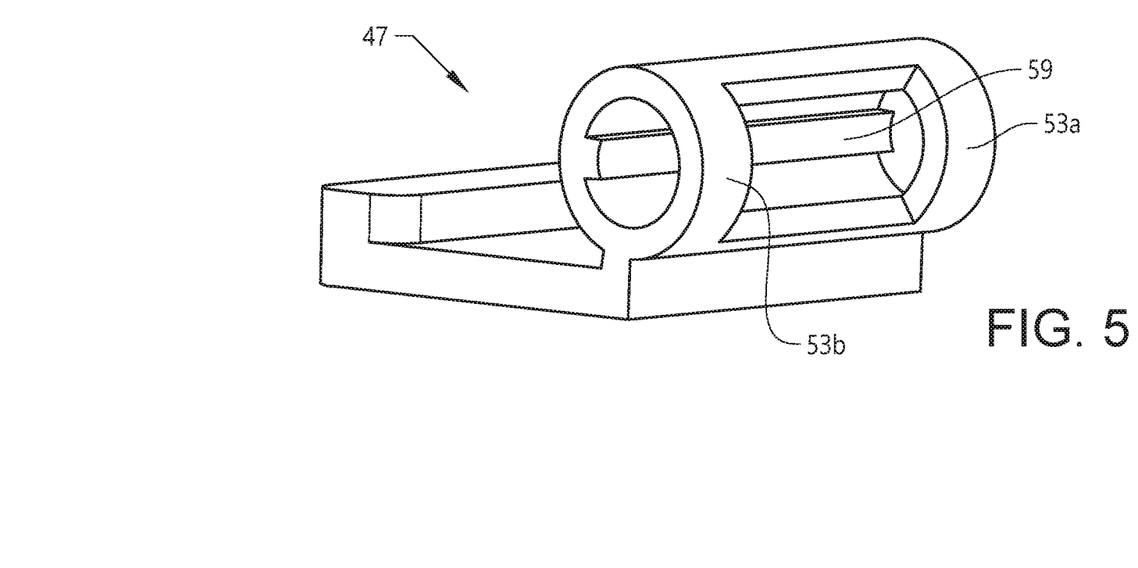
FIG. 5 is a detailed view of a slider of the adjustment mechanism.

As can best be seen in the detailed view of FIG. 4, the rack 45 may as an option comprise two indentations 51a, 51b. The slider 47 comprises two corresponding first protrusions 53a, 53b, which is best seen in FIG. 5. The first protrusions 53a, 53b form a respective ring being a part of the body of the slider 47 enclosing the shaft 23. Accordingly the rings enclose the shaft 23 and form first protrusions 53a, 53b in the direction facing the rack 45. Further the rings are shaped to fit in the indentations 51a, 51b. In principle, it would be enough to have a single first protrusion 53a, 53b, but it has been found that two or more first protrusions 53a, 53b give better stability in the transfer of movement from the slider 47 to the rack 45.

The indentations 51a, 51b are open in the second direction $D_2$ such that the slider 47 with its first protrusions 53a, 53b is able to rotate freely without interfering with the rack 45. However, the indentations 51a, 51b are delimited in the first direction $D_1$ by delimitation walls 55a, 55b, 55c, 55d, such that a sliding movement of the slider 47 along the shaft 23 will displace the rack 45 correspondingly by the first protrusions 53a, 53b abutting at least one of the delimitation walls 55a, 55b, 55c, 55d of the indentations 51a, 51b, thereby being able to transfer the translational movement of the slider 47 to a translational movement of the rack 45.

Going back again to FIG. 2, it may be seen that an air guide 57 is fixedly positioned at least partly inside the housing 9, in the illustrated embodiment illustrated as completely inside the housing 9, and extending in the first direction $D_1$, i.e. in the length direction of the housing 9. When viewed through the air discharge opening 15, the air guide 57 is located at about half the height of the air discharge opening 15. This location of the air guide 57 is suitable for air vents 5, in which it is desirable to be able to guide an equal amount of air above and below the air guide 57. The air guide 57 divides the air stream into a first flow above the air guide 57 and a second flow below the air guide 57. The air guide 57 extends along the whole length of the housing. The shaft 23 and the rack 45 are located within the air guide 57, such that they are not visible by the user of the air vent 5.

The slider 47 cooperates with the shaft 23 by means of a second protrusion in the form of a rib 59 in the slider 47, best seen in FIG. 5, at least partly being located in a groove 61 of the shaft 23. As mentioned above, the slider 47 comprises a body enclosing the shaft 23. The rib 59 protrudes on the inside of the enclosing body, i.e. from the inner wall of the body facing the shaft 23. The groove 61 allows sliding movement along the shaft 23, but is able to transfer a rotational movement of the slider 47 to the shaft 23. Accordingly, the groove 61 extends in the first direction $D_1$. Instead of the rib-shaped extended second protrusion 59, it would also be possible to instead have two, three or more small second protrusions.

Figure 6:
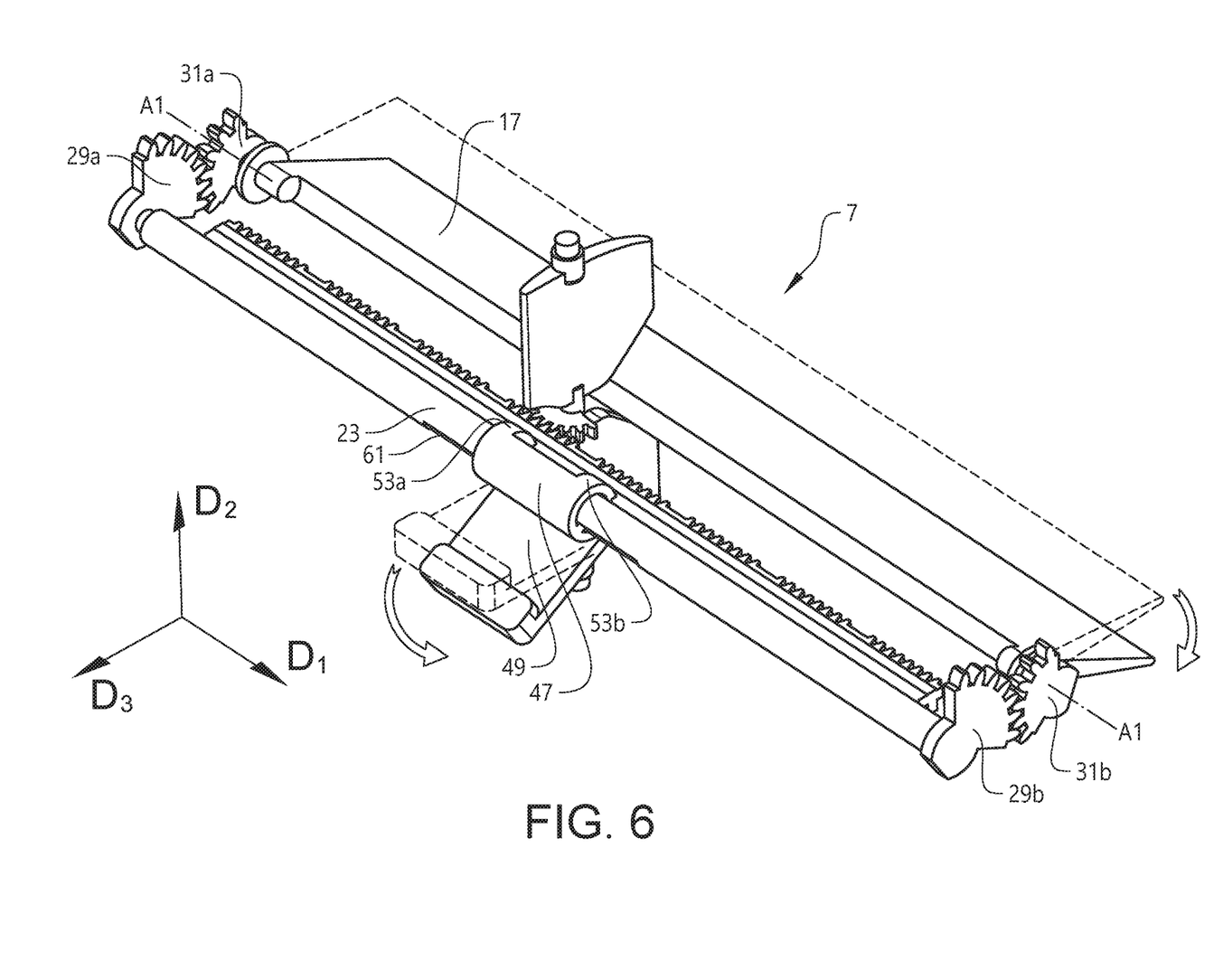
FIG. 6 is a perspective view of the adjustment mechanism with a tilted first vane.

FIG. 6 illustrates operation of the adjustment mechanism 7 in order to adjust the first vane 17 to thereby adjust the air flow in the second direction $D_2$, i.e. upwards or downwards in the illustrated embodiment. When the slider 47 is rotated, e.g. by the user actuating the slider 47 by means of pressing the tab 49 downwards, the rotation is transferred to a corresponding rotation of the shaft 23 by the rib 59 cooperating with the groove 61. The rotating shaft 23 in turn rotates the first portion 29a, 29b of the first connection 25a, 25b. Due to the geared connection, the second portion 31a, 31b also rotates, which causes the first vane 17 to rotate around the first rotation axis $A_1$. Thereby the first vane 17 is adjusted, in this case tilted, which will change the direction of the air stream as seen in the second direction $D_2$, i.e. upwards or downwards. To summarize, a rotation of the slider 47 is transferred to an adjustment, e.g. a tilting, of the first vane 17.

Figure 7:
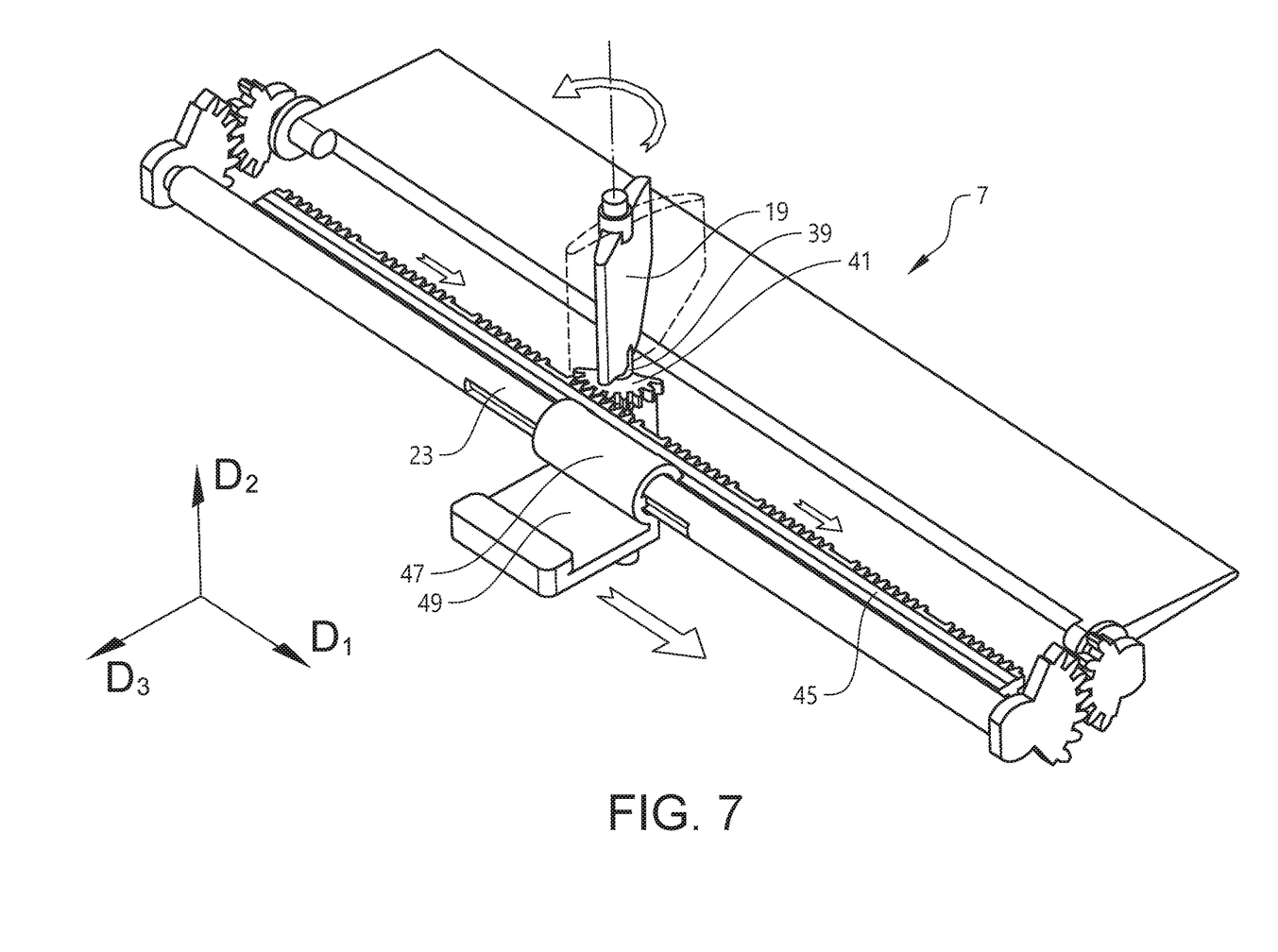
FIG. 7 is a perspective view of the adjustment mechanism with a tilted second vane.

The adjustment mechanism 7 may also be adjusted in order to adjust the second vanes 19 to thereby adjust the air flow in the first direction $D_1$, i.e. sideways to the left or to the right in the illustrated embodiment, see FIG. 7. When the slider 47 is slid along the shaft 23, e.g. by the user actuating the slider 47 by means of the tab 49, the translational movement in the first direction $D_1$ is transferred to a corresponding translational movement of the rack 45 by the first protrusions 53a, 53b of the slider 47 cooperating with the indentations 51a, 51b of the rack 45, cf. FIGS. 4 and 5. The slider 47 thereby pushes the rack 45 to either side. The translational displacement of the cogs of the rack 45 causes the pinion 41 to rotate. This in turn causes the spindle 39 to rotate, which tilts the second vane 19. Thereby the direction of the air stream as seen in the first direction $D_1$ is changed in a sideways direction. To summarize, a sliding translation of the slider 47 is transferred to an adjustment, e.g. a tilting, of the second vane 19.

As best seen in FIG. 3, there is a group of cogs 43 provided for the pinion 41 of each second vane 19, such that the plurality of second vanes 19 can be moved in synchrony with each other in order to guide the air stream passing the air vent 5 in a sideways direction.

Even if it is indicated in FIG. 3 that each second vane 19 has its own pinion 41, it would also be feasible to dispense with the pinions 41 for one or more of the second vanes 19, and instead connect that second vane by a link to another second vane provided with a pinion, such that they can move in synchrony. Purely as an example, the second vanes 19 may be arranged in one or more groups, such that at least one of the second vanes 19 in the group is provided with a pinion and the other second vanes in the group are coupled to that second vane by means of e.g. a link. In that way, it would be enough that only one of the second vanes in the group is provided with a pinion. It would be hence enough if only one of the second vanes 19 of the whole adjustment mechanism 7 is provided with a pinion 41.

The adjustment of the first vane 17 and of the adjustment of the second vanes 19 may be performed independently of each other although the same slider 47 is used for both operations. By freely combining the tilting of the first vane 17 and of the tilting of the second vanes 19, thus combining upwards and downwards adjustment of the air stream with sideways adjustment of the air stream, any desired direction of the exiting air stream may be obtained.

Further modifications of the invention within the scope of the appended claims are feasible. As such, the present invention should not be considered as limited by the embodiments and figures described herein. Rather, the full scope of the invention should be determined by the appended claims, with reference to the description and drawings.

The invention claimed is:

1. An adjustment mechanism for an air vent, which adjustment mechanism is adapted to guide an air stream flowing through said air vent, said adjustment mechanism comprising
    one or more adjustable first vanes having a main extension in a first direction (D1),
    one or more adjustable second vanes having a main extension in a second direction (D2) being angled to said first direction (D1),
    a shaft extending in said first direction (D1) and being rotatable around its length axis (A3),
    a slider being movably attached to said shaft, such that said slider is able to slide along said shaft in said first direction (D1),
    a rack, extending in parallel to said shaft,
    a pinion, rigidly connected to one of said second vanes and configured to cooperate with said rack,
    wherein said shaft is mechanically coupled by at least one first connection to said one or more first vanes, such that a rotation of said shaft is transferred to an adjustment of said one or more first vanes, and said slider is adapted to cooperate with said rack, such that a sliding movement of said slider along said shaft displaces said rack, which displacement is transferred to an adjustment of said one or more second vanes by means of said pinion being adapted to cooperate with said rack,
    an elongate housing having a length in said first direction (D1) of said adjustment mechanism,
    wherein said elongate housing encloses said one or more first vanes and said one or more second vanes, said slider being directly or indirectly accessible from an outside of said elongate housing,
    wherein said one or more first vanes and one or more second vanes are located in a common chamber within said elongate housing,
    an air guide, at least partly located within said housing, fixedly positioned in relation to said housing and extending in said first direction (D1),
    wherein said rack of said adjustment mechanism is located within said air guide.

2. The adjustment mechanism of claim 1, wherein said slider is configured to rotate together with said shaft, said slider being freely rotatable relative to said rack.

3. The adjustment mechanism of claim 1, wherein said at least one first connection mechanically coupling said shaft to said one or more first vanes comprises a geared connection.

4. The adjustment mechanism of claim 1, wherein said at least one first connection is located at or adjacent to an end of said shaft.

5. The adjustment mechanism of claim 1, wherein said one or more first vanes has a respective first rotation axis (A1) extending in said first direction (D1), said one or more first vanes being adjustable by being rotatable around said first rotation axis (A1).

6. The adjustment mechanism of claim 1, wherein said one or more second vanes has a respective second rotation axis (A2) extending in said second direction (D2), said one or more second vanes being adjustable by being rotatable around said second rotation axis (A2).

7. The adjustment mechanism of claim 1, wherein one of said rack and said slider comprises an indentation, and the other of said rack and said slider comprises a first protrusion adapted to fit in said indentation, said indentation being open in said second direction (D2) to allow said slider to freely rotate with said shaft without interfering with said rack, said indentation having a delimitation wall in said first direction (D1), such that a sliding movement of said slider along said shaft displaces said rack correspondingly by said first protrusion transferring said displacement to said delimitation wall.

8. The adjustment mechanism of claim 1, wherein one of said slider and said shaft comprises a second protrusion and the other of said slider and said shaft comprises a groove extending in said first direction (D1), said second protrusion being located at least partly in said groove.

9. The adjustment mechanism of claim 1, wherein said adjustment mechanism further comprises an air adjustment actuator connected to or integrated with said slider.

10. The adjustment mechanism of claim 1, wherein said one or more second vanes comprises a first vane portion at least partly located at a first side of said one or more first vanes and a second vane portion located at a second opposite side of said one or more first vanes.

11. The adjustment mechanism of claim 1, wherein said shaft of said adjustment mechanism is located within said air guide.

12. The adjustment mechanism of claim 1, wherein, when said adjustment mechanism comprises an air adjustment actuator connected to or integrated with said slider, said slider and said air adjustment actuator being displaceable in relation to said air guide, said air adjustment actuator protruding above or below said air guide.

13. The adjustment mechanism of claim 1, wherein said one or more first vanes and one or more second vanes are located in said common chamber within said elongate housing such that a first vane portion of one or more second vanes is at least partly located at a first side of said one or more first vanes and a second vane portion of said one or more second vanes is located at a second opposite side of said one or more first vanes.

14. The adjustment mechanism of claim 4, wherein said at least one first connection comprises a first connection located at each end of said shaft.

15. The adjustment mechanism of claim 1, wherein said air guide is located downstream of said one or more first vanes and said one or more second vanes as seen in a flow direction of said air stream being guided through said air vent.

16. The adjustment mechanism of claim 1, wherein said air guide extends over substantially a whole length of said elongate housing.

* * * * *